(No Model.)　　　　　　　　　　　　　　　　　2 Sheets—Sheet 1.
H. RUPPEL.
GASOLINE OR VAPOR STOVE.
No. 500,747.　　　　　　　　　　Patented July 4, 1893.
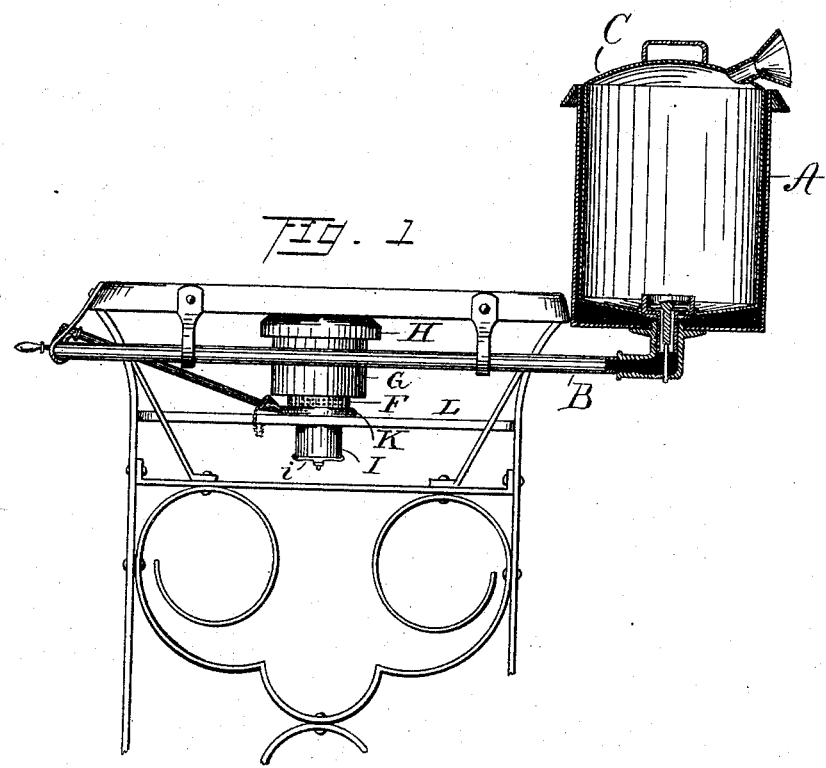
Witnesses.　　　　　　　　　　　　　Inventor.

(No Model.) 2 Sheets—Sheet 2.
H. RUPPEL.
GASOLINE OR VAPOR STOVE.
No. 500,747. Patented July 4, 1893.
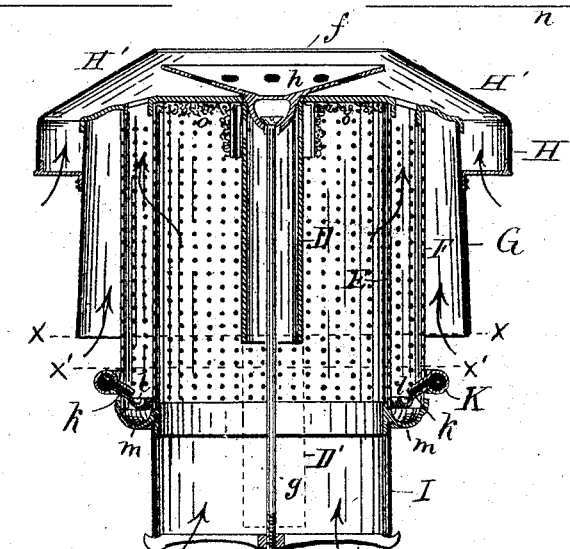
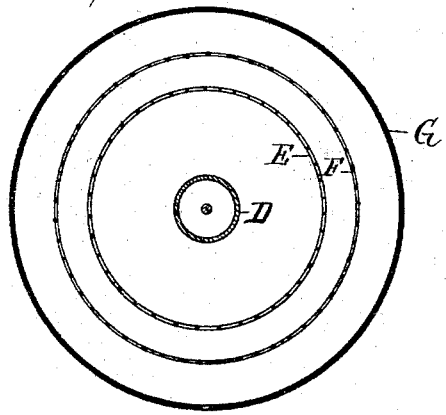
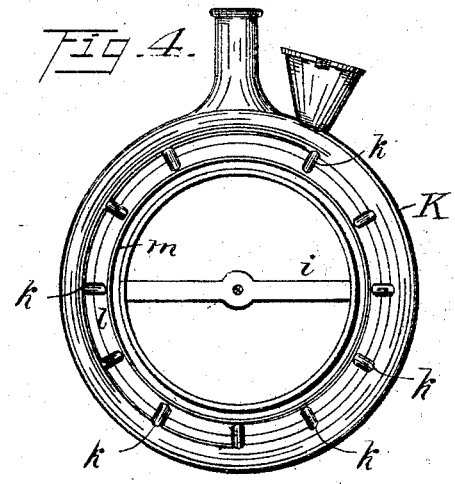
Witnesses.
Inventor.

UNITED STATES PATENT OFFICE.

HENRY RUPPEL, OF CLEVELAND, OHIO, ASSIGNOR TO THE DANGLER STOVE AND MANUFACTURING COMPANY, OF SAME PLACE.

GASOLINE OR VAPOR STOVE.

SPECIFICATION forming part of Letters Patent No. 500,747, dated July 4, 1893.

Application filed October 11, 1892. Serial No. 448,591. (No model.)

*To all whom it may concern:*

Be it known that I, HENRY RUPPEL, a citizen of the United States, residing at Cleveland, in the county of Cuyahoga and State of Ohio, have invented certain new and useful Improvements in Gasoline or Vapor Stoves, of which the following is a full, clear, and complete description.

The nature of my invention relates to the burners, constructed with a series of perforated and non-perforated chimneys, so arranged in connection with a hood and center funnel shaped cap, that the heat is concentrated toward the center of the burner, thereby creating an intense heat which is spread by means of the cooking utensil being placed above, over it.

It also relates to a tubular ring or channel surrounding the lower terminals of the perforated chimneys this ring being provided at intervals with openings into the lighting groove as hereinafter shown. An air cylinder extends down below the pan or shelf of the burner.

That the invention may be seen and fully understood by others, reference will be had to the following specification and annexed drawings forming part thereof.

Figure 1. is a partial end view of the improved stove showing the tank in vertical section. Fig. 2. is an enlarged vertical section of one of the burners. Fig. 3. is a cross section on line $x.\ x.$ Fig. 2, and Fig. 4. is a cross section on line $x'.\ x'.$ Fig. 2.

Similar letters of reference designate similar parts in the drawings and specification.

An outside casing A is attached to the back of the stove, and within it is a tank C for liquid fuel, in connection with the supply pipe B which runs to the burner.

The burner is provided with an interior non-perforated chimney D, which may be as shown in Fig. 2, or it can be extended down below the pan or shelf L as shown by dotted lines D'.

Outside of the non-perforated chimney D. are two perforated chimneys E. and F. and outside the perforated chimneys an outer casing G. Figs. 1 and 2. A bonnet or hood H. with a converging roof H'. circumscribes the upper portion of the casing G. This hood H. is open in the center as shown at $f$. Fig. 2. A screw $g$ is headed in a funnel shaped cap $h$. and passes down through the interior of the non-perforated chimney D. the lower terminal being threaded into the cross bar $i$. This cross bar $i$ spans a casing I. which extends below the shelf L Fig. 1. or base of the burner proper.

Liquid fuel is supplied to the burner through the tubular ring K. which circumscribes the outer perforated chimney F. The tubular ring K. is in open connection with the supply pipe B. and is provided with a series of tubular openings $k$. which convey the liquid fuel into the circular trough $l$. situated between the two perforated chimneys E. and F. just above the larger annular trough $m$. Figs. 2 and 4. The fluid flows through the supply tube B into the tubular ring K from which it passes into the small circular trough $l$ through the tubular openings $k$, in said tubular ring. A quantity of the fluid in the small circular trough $l$ overflows into the large annular trough $m$ where it is ignited and thus vaporizes the oil in said circular trough $l$, at the same time heating the contents of the tubular ring $k$. It will now be readily seen that a constant and even dissemination of the oil must result from the above described arrangement and that the vapor arising from the same will produce a uniform combustion and intense heat. The ignited gas or vapor passes upward between the two perforated chimneys E. and F. and is then concentrated in the opening $f$. by the converging roof of the hood H. and funnel shaped cap $h$. Figs. 1 and 4. thus producing an intense heat. It will readily be seen that by placing a vessel over the burner on top of the stove (the line of which is shown at $n.\ n.$ Fig. 4) the heat will be spread under said vessel. The upper portion of the interior flue between the chimney walls D. and E. is lined with asbestus $o$ Fig. 4. or its equivalent, to protect it from the intense heat created within said flue.

Air is supplied from the under side of the burner as shown by arrows in Fig. 4.

What I claim, and desire to secure by Letters Patent, is—

1. In a vapor burner, the combination with an annular fuel trough, of two concentric perforated chimneys surmounting said trough, a top plate having suitable openings coinciding with the annular space between said chimneys, a central chimney depending from said top plate, a funnel shaped cap resting on said top plate, an air tube below the fuel trough, a bar across the lower end of said air tube, and a screw bolt passing through said cap, central chimney and cross bar, and serving to hold all the parts together, substantially as described.

2. In a vapor burner the combination with an annular fuel trough, of two concentric perforated chimneys surmounting said trough, a top plate having openings coinciding with the annular space between said chimneys, a central chimney depending from said top plate, a funnel shaped cap resting on said top plate, an air tube below said fuel trough, a cross bar spanning the lower end of said tube, a screw bolt passing through the cap, central chimney, and cross bar, and casing suspended from the outer rim of the top plate, substantially as described.

3. In a vapor burner the combination with an annular fuel trough, of an overflow trough below the same, a circular feed pipe having nozzles delivering into said fuel trough, two continuous perforated chimneys rising from said overflow trough, the outer one intervening between the feed pipe and the fuel trough, a top plate having openings coinciding with the annular space between the said chimneys, a central chimney depending from said top plate, a lining of asbestus covering said top plate between the central and inner perforated chimneys, a funnel shaped cap resting on the top plate, an air tube below the overflow trough, a cross bar spanning the lower end of said air tube, a screw bolt passing through the cap, central chimney and cross bar, a casing surrounding the chimneys, and a frusto-conical hood surrounding the top plate and cap, substantially as described.

In testimony whereof I affix my signature in presence of two witnesses.

HENRY RUPPEL.

Witnesses:
E. V. BUTLER,
A. E. GILBERT.